United States Patent [19]

Murphy, Jr. et al.

[11] Patent Number: 5,251,305
[45] Date of Patent: Oct. 5, 1993

[54] APPARATUS AND METHOD FOR PREVENTING BUS CONTENTION AMONG A PLURALITY OF DATA SOURCES

[75] Inventors: Philip A. Murphy, Jr., King of Prussia; Wayne A. Genetti, Phoenixville; Gunnar K. Gunnarsson, West Chester; Edward J. Pullin, Norwood; Gary Chang-Feng Wu, Audubon, all of Pa.

[73] Assignee: Unisys Corporation, Plymouth Meeting, Pa.

[21] Appl. No.: 680,345

[22] Filed: Apr. 4, 1991

[51] Int. Cl.⁵ .................................. G06F 13/36
[52] U.S. Cl. ............................ 395/325; 395/550; 370/85.1; 364/270; 364/240.1; 364/239.9; 364/DIG. 1
[58] Field of Search ............ 364/DIG. 1, DIG. 2, 364/130; 395/325, 550, 200, 650, 800, 725; 307/480, 473; 370/85.1, 85.2; 340/825.5

[56] References Cited

U.S. PATENT DOCUMENTS

| | | | |
|---|---|---|---|
| 4,084,233 | 4/1978 | Handly et al. | 395/800 |
| 4,302,808 | 11/1981 | Zanchi et al. | 364/200 |
| 4,374,413 | 2/1983 | Comfort et al. | 364/200 |
| 4,418,386 | 11/1983 | Vrielink | 364/200 |
| 4,556,939 | 12/1985 | Read | 395/325 |
| 4,597,054 | 6/1986 | Lockwood et al. | 364/900 |
| 4,600,992 | 7/1986 | Bondreau et al. | 364/200 |
| 4,611,297 | 9/1986 | Dudley et al. | 364/900 |
| 4,692,895 | 9/1987 | Huffman | 364/900 |
| 4,730,268 | 3/1988 | Marin | 364/900 |
| 4,779,089 | 10/1988 | Theus | 364/200 |
| 4,961,140 | 10/1990 | Pechanek et al. | 364/200 |
| 5,086,427 | 2/1992 | Whittaker et al. | 370/85.1 |

*Primary Examiner*—Michael R. Fleming
*Assistant Examiner*—Gopal C. Ray
*Attorney, Agent, or Firm*—Ratner & Prestia

[57] ABSTRACT

An apparatus for preventing bus contention among a plurality of data sources is described which creates signals to be used to disable two of three data sources which share a common bus immediately prior to a bus access cycle. The circuit employs a negative edge triggered flip-flop. This flip-flop generates disable signals which are shifted in phase by 90° with respect to the bus access clock signal. These signals are active one-quarter of a clock cycle before a new bus cycle begins. The early disable serves to clear the bus for access by substantially eliminating the possibility that a slowly responding disabled data source is still active while a quickly responding enabled data source has just become active. The early disabling of the data signals does not result in loss of data. When all data sources on the bus are turned off, a high signal simply goes higher and a low signal rises slowly. The third data source and the disable circuitry for the other two sources are fabricated on the same integrated circuit to compensate for variations in speed from one circuit to the next.

8 Claims, 5 Drawing Sheets

APPARATUS AND METHOD FOR PREVENTING BUS CONTENTION AMONG A PLURALITY OF DATA SOURCES

FIELD OF THE INVENTION

The present invention relates to the problem of contention between multiple data sources and data sinks on a data bus, and in particular to a circuit which forces synchronization among several mixed TTL and CMOS data sources vying for bus access.

BACKGROUND OF THE INVENTION

In computer systems, several data sources may be interconnected through a common set of signal lines, known as a bus. Bidirectional buffers with separate drivers and receivers (bus transceivers) are commonly used to interface a data source and/or a data sink to a bus. FIG. 1 is a block diagram representing a data bus which is shared among several data sources and sinks.

In FIG. 1, a CMOS standard cell array 110 and a local memory 112 are coupled via a common local bus 114 to a system bus 118 via a TTL transceiver 116. In this configuration, the memory 112 and gate array 110 may be configured as a state machine which receives input data from and provides output data to the rest of the processing system which is coupled to state machine via the system bus 118.

Bidirectional buffer transceivers, such as the TTL transceiver 116, and similar transceivers (not shown) internal to the gate array 110 and memory 112, allow a two-way transfer of data between a data source/sink and one or more other data source/sinks via the local bus 114. Buffer transceivers are used because they are able to provide the relatively high currents that are desirable to drive multiple data sinks connected to the bus. Bus transceivers typically use two control signals: a direction control signal (not shown) and an output enable signal (not shown). The direction control signal enables the transceiver to place data onto the bus, or to accept data from the bus. The output enable signal determines whether the output terminals of the transceiver are active or disabled.

While active, the transceivers provide the selected output signal which may be in a logic-high or a logic-low state. When the output terminals are disabled, however, the transceivers neither sink current from nor source current to the bus. The voltage level at the output terminals may be high or low, but the transceiver effectively presents an open circuit to the bus. This disabled state is known in the art as the high-impedance state. Since these devices can having three distinct output states (logic-high, logic-low, and high-impedance), they are commonly referred to as TRISTATE ™ devices.

A bus may be either "pulled-high" or "pulled-low." When a bus is pulled-low, pull-down resistors (not shown) connect the bus to a source (not shown) of reference potential (e.g. ground) which corresponds to a logic-low state. When a bus is pulled-high, pull-up resistors (not shown) are connected between the bus and a source (not shown) of operational potential having a value which corresponds to a logic-high state. Output terminals which are coupled to a bus which is pulled-high and which were in a logic-high state prior to becoming disabled remain in a logic-high state. Output terminals which were in a logic-low state prior to becoming disabled slowly rise to a higher level at a rate determined by the RC time constant of the bus line. The resistance of the pull-up resistors and the reactance of the printed circuit lines that constitute the bus are the main factors that determine this time constant.

Only one data source may assert a signal onto the data bus during a bus cycle. Tristate contention occurs whenever two or more output drivers are enabled to place signals onto the bus simultaneously. This can happen if, for example, there is a delay in disabling one data source so that it remains enabled while another data source is becoming enabled. On a bus with multiple sources, an overlap of this type may cause repeated current spikes when overlapping sources have complementary logic states. These current spikes may significantly shorten the expected lifetime of components used in the system.

FIG. 2 is a simplified block diagram of a prior art system in which several TTL transceiver interfaces provide data individually to several I/O subsystems. System bus 118, known as IBUS in this embodiment, is coupled to supply data to and receive data from several I/O subsystems. In this embodiment of the invention, each I/O subsystem appears to the bus 118 as a CMOS gate array (210, 212 or 214) and a local memory (220, 222 or 224). Data from system bus 118 is distributed to the local busses through each set of transceivers 202, 204 and 206. CMOS gate arrays 210, 212 and 214, and local memories 220, 222 and 224, each may provide data to and receive data from their respective local busses. Thus, it is desirable to prevent simultaneous access to each of the local busses to prevent Tristate contention.

One way in which simultaneous access may be prevented is to inhibit one of the sources to each of the local busses immediately prior to a bus access interval. In the circuitry shown in FIGS. 2 and 3, all of the TTL transceivers 202, 204 and 206 are disabled immediately prior to a bus access interval for the IBUS 118.

FIG. 3 is a logic schematic diagram of the circuitry used to disable each of the TTL transceivers 202, 204 and 206 in the prior art system. In this system, a Tristate disable pulse generator circuit 250 is located on a remote clock generator card. Output disable pulse signals are generated using a 32 Megahertz system clock signal, SCLK, provided by a source 252. In this embodiment of the invention, the source 252 may be, for example, a crystal controlled oscillator (not shown) combined with wave shaping circuitry (not shown) to produce a 32 MHz clock signal having approximately a 50% duty cycle. A 16 Megahertz CMOS clock signal is also provided by source 254. The CMOS clock signal may be obtained, for example, by dividing the signal SCLK in frequency by a factor of two. ECL and TTL delay lines 256, 258, 260, 262 and 264 and logic gates 261, 263 and 266 are used to construct respective active high pulses of the desired shape. The resulting pulse signals are converted from ECL to TTL levels and transmitted from the clock generator card by the drivers 266. It should be noted that although block 253, block 259, and gates 270, 272, 274, 276, 278 and 280 are shown in FIG. 3, a discussion detailing their functions is unwarranted.

Each of the six signals TRISTATE PULSE 1 through TRISTATE PULSE 6 is transmitted over a relatively long cable to reach the respective TTL transceivers (e.g. 202, 204 and 206) which are coupled to the local busses. The loads are distributed as equally as possible over the ECL-to-TTL translator driver devices 266 and are coupled to the respective transceivers via equally long lines to minimize any skew that may exist between the pulse signals.

In this configuration, each TTL transceiver on the local bus receives a 16 nanosecond TRISTATE PULSE which disables the transceiver output ports just prior to the next cycle of a 16 Megahertz local bus access clock signal. In response to the disable pulse, each TTL transceiver forces its output signals to the high impedance state before the next bus cycle begins.

During the next bus cycle, one of the transceivers 202 through 206 may be conditioned to provide data from the IBUS 118 to its associated local bus while one or both of the transceivers internal to the CMOS gate array and the local memory are conditioned to accept data from the local bus.

As an example of how an attempted simultaneous access may occur, consider a sequence of events in which, immediately prior to a bus access period, local memory 220 has been providing data to the CMOS gate array 210 and then, during the bus access period, the TTL transceiver 202 is conditioned to provide data from the bus 118 to the gate array 210. In this sequence of events there may be an overlap in time when the drivers of the TTL transceiver 202 are enabled before the drivers internal to the memory 220 can be disabled. This overlap is dependent upon such factors as the speed of individual drivers and the timing characteristics of the logic in the disable path. In the prior art system described above, a maximum contention time of 5.74 nanoseconds exists when a slow CMOS driver, responding to a slow disable logic signal, continues to drive the bus from a previous cycle while a fast TTL transceiver, responding to a fast enable signal begins to drive the bus on the next cycle. Such contention, repeated millions of times per second, can stress the integrated circuits to the point of failure.

Furthermore, systems which utilize CMOS gate arrays as data sources may exhibit relatively large variations in timing characteristics from among several otherwise identical integrated circuits. Variations in performance characteristics of up to 300 percent are not uncommon among circuits from a given CMOS family. Thus, it may be desirable to employ adjustable delay line circuits to adjust the timing of the respective Tristate disable pulses to compensate for different timing characteristics of individual CMOS gate arrays. These delay elements, however, tend to increase the cost of the system.

Alternatively, this problem may be addressed by defining the bus clock cycle to include a dead cycle of the system clock signal between successive cycles in which a transceiver is allowed to provide data to the bus. Slowly responding transceivers could overlap into this dead cycle without interfering with the activation of the another transceiver during the next bus cycle. This solution is undesirable, however, since it degrades system performance by reducing the data bandwidth of the bus.

SUMMARY OF THE INVENTION

The subject invention is a circuit which employs a relatively fast clock signal to disable the output ports of several data sources on a data bus. A disabling signal is developed which is timed to be shifted in phase with respect to a bus access signal that governs access to the local data bus. Multiple output disable signals, generated by this circuitry, are applied to control the state of the output terminals of all but one data source driver on the local data bus.

The Tristate disable circuit acts to ensure that the output drivers of all but one of the data sources are disabled before any other driver output terminals are enabled. The disable signals are each applied to their respective data source one-quarter cycle prior to the next bus access cycle. The effect of turning off the drivers one quarter cycle early is to prevent the simultaneous application of signals to the local bus by more than one driver, thereby eliminating Tristate contention on the local bus.

The disable signal circuitry is contained on a CMOS gate array integrated circuit which also contains one of the data sources on the local bus. Fabricating the Tristate disable circuitry on the same CMOS integrated circuit compensates for individual differences in timing characteristics.

DETAILED DESCRIPTION

Figure 1:
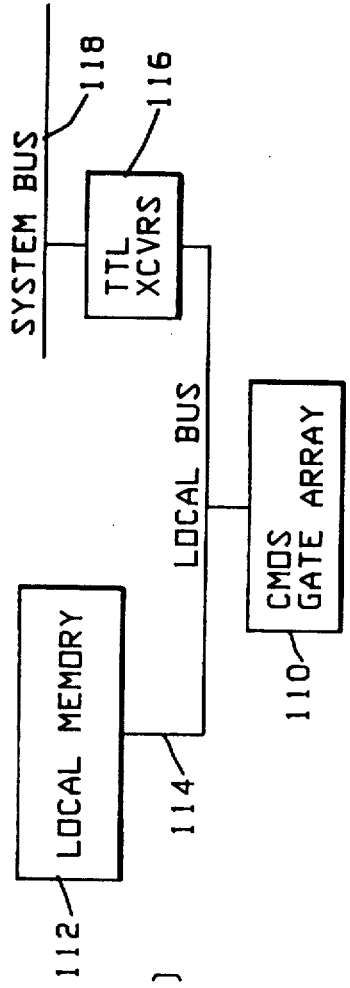
FIG. 1 (prior art) described above, is a simplified block diagram of a system bus shared by several sources of data.
Figure 2:
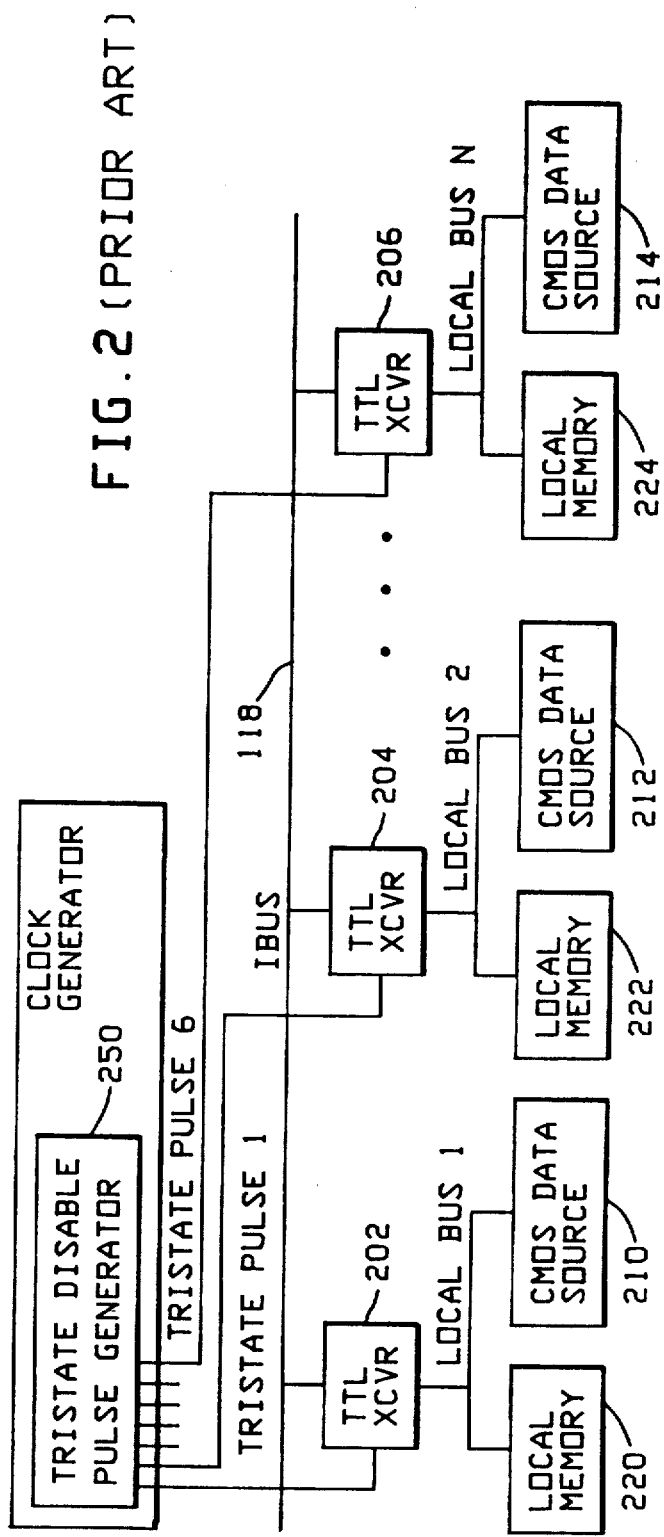
FIG. 2 (prior art) described above, is a simplified block diagram of a system in which Tristate contention elimination over several subsystems is performed by a signal generated from a central, remote source.
Figure 3:
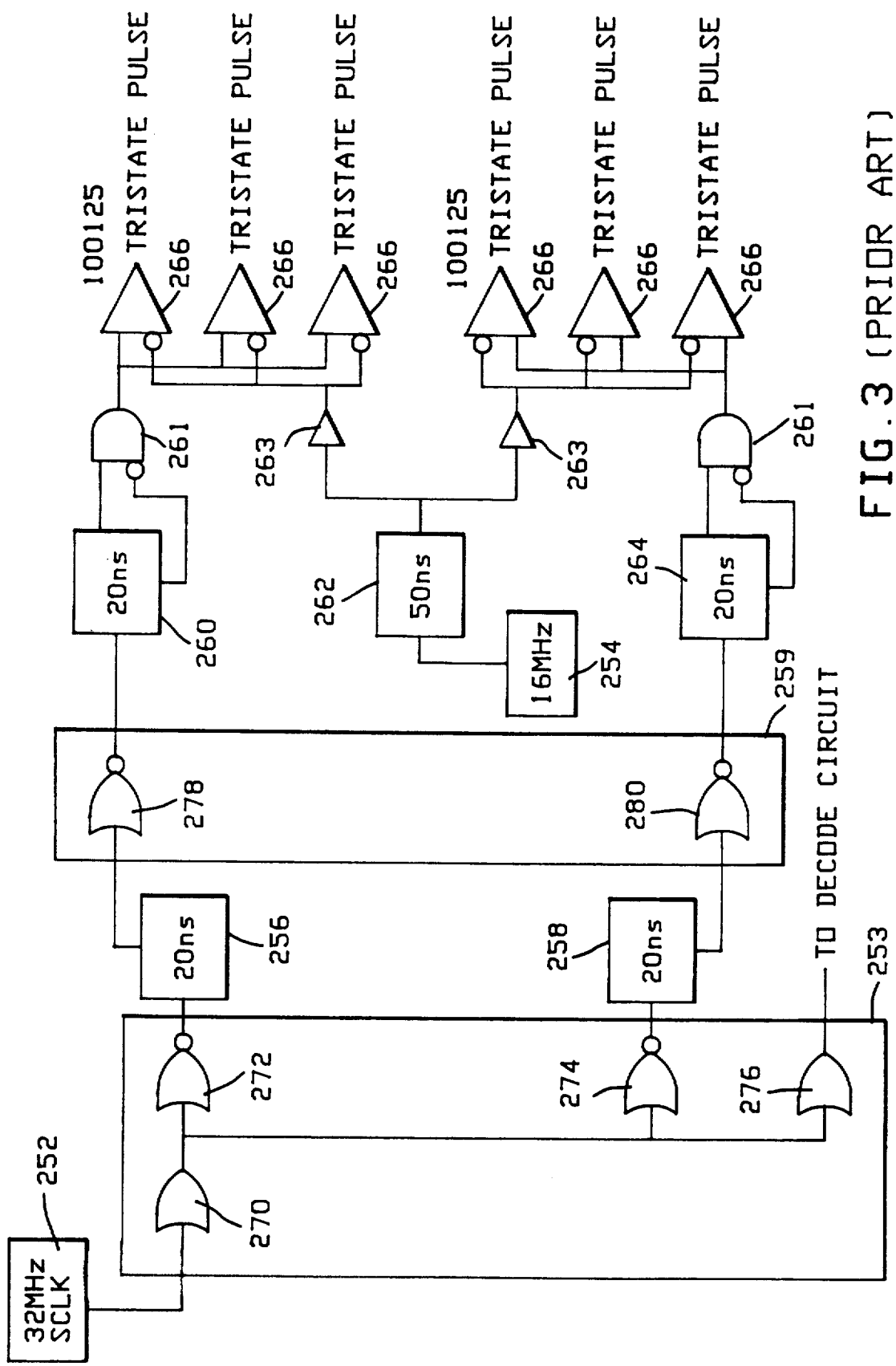
FIG. 3 (prior art) described above, is a logic schematic diagram of a Tristate control pulse generator.
Figure 4:
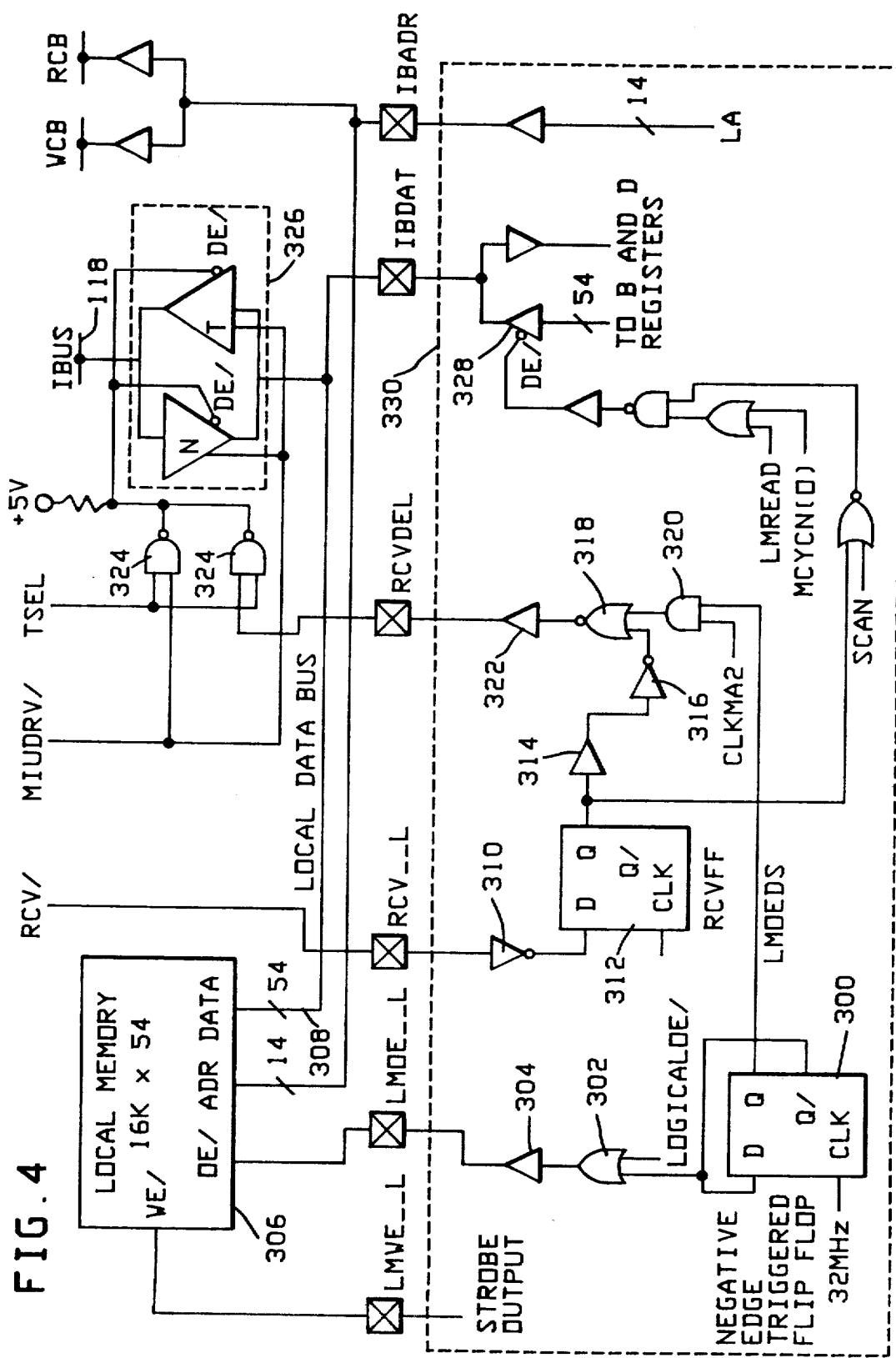
FIG. 4 is a logic schematic diagram of an exemplary embodiment of a Tristate contention elimination circuit, set into the larger framework of a common data bus, according to the present invention.

FIG. 4 shows an exemplary embodiment of a Tristate contention elimination circuit according to the present invention. A local data bus 308 is shared among three sources of data: a Local Memory 306, a TTL transceiver 326, and a CMOS transceiver 328. The CMOS transceiver 328 is a part of a CMOS gate array integrated circuit, 330. The data sources each access the local bus using a 16 MHz (62.5 nanosecond period) bus cycle. The same bus clock signal is used to control access to the local data bus 308 and the system bus 118. The TTL transceiver 326 is controlled by an output enable signal, TSEL and a direction signal MIUDRV/. The signal TSEL is activated coincident with transitions of the bus clock signal.

The principal sources of bus contention in the system shown in FIG. 4 are the TTL transceiver 326, the CMOS transceiver 328 of the IC 330 and the TTL transceiver (not shown) internal to the local memory 306. If the CMOS transceiver 328 is relatively slow in responding and the TTL transceiver 326 is relatively quick, simultaneously applied signals which disable the transceiver 328 from providing data to the bus 308 and enable the transceiver 326 to provide data to the bus may result in a brief time interval in which both transceivers are enabled as sources to the bus 308. As set forth above, if, during the overlap interval, the CMOS drivers and the TTL drivers present complementary logic states to the bus, there may be a current spike which, repeated over many operations can damage both the CMOS and the TTL circuitry.

Briefly, the circuitry shown in FIG. 4 forces synchronization between the local memory 306 and the TTL transceiver 326 on the one hand and the CMOS transceiver 328 of the IC 330 on the other hand. Circuitry, described in detail below, internal to the IC 330 generates inhibiting signals which are applied to respective control input terminals of the local memory 306 and the TTL transceiver 326. These inhibiting signals force output terminals of the respective circuits into a high-impedance state one-quarter of a clock cycle prior to the start of the next cycle of the bus clock signal. Since these inhibiting signals are generated internal to the CMOS IC 330, any speed variations in the operation of the CMOS transceiver 328 caused by random process variations are also reflected in the inhibiting signals. Consequently, the inhibiting signals act to synchronize the memory 306 and the TTL transceiver 326 to the CMOS transceiver 328.

The RC time constant of the bus, described above, causes the bus to hold the data provided by a source for a short time after the source is disabled. Thus, if a data source is disabled prematurely, that is to say, before the data it provides can be transferred to a data sink, the data is temporarily held on the bus and may be latched by the source without error until the logic-low levels have risen to a potential which may be confused with the logic high level.

The circuitry which generates the inhibiting signals includes a flip-flop 300 which is configured as a frequency divide-by-two circuit. In this embodiment of the invention, flip-flop 300 toggles its output state with each negative-going edge of its input clock signal. In this configuration, the signal on output terminal Q/ is fed back to input terminal D. The 32 MHz system clock signal SCLK provided by source 252 is applied to the CLK input terminal of flip-flop 300. This clock signal is at twice the frequency of the bus clock signal. Other flip-flops on the IC 330 change state coincident with positive-going transitions of their respective clock signals. In addition, the bus clock signal changes state substantially coincident with the positive going transitions of the system clock signal.

Thus, the state changes of the signal provided by the flip-flop 300 are shifted in phase by 90° with respect to the state changes of the other flip-flops on the IC 330. These other flip-flops are said to be positive-edge triggered. Flip-flop 300, however, is negative-edge triggered, i.e. it reverses the signals on output terminals Q and Q/ on the negative-going transitions (negative edges) of the signal 32 MHz.

One output signal, LMOEDS/, of flip-flop 300 is a periodic signal with a frequency equal to one-half of the frequency of the input clock signal, or 16 MHz in this embodiment. The signal LMOEDS/ is gated by an OR gate 302 with a signal LOGICALOE/, which is generated by circuitry (not shown) within the IC 330 to transfer data from the local memory 306 to internal registers (not shown) of the IC 330. The output signal of OR gate 302 is transmitted through a buffer circuit 304 from the output terminal LMOE_L, of the gate array 330, to an input terminal OE/ of the local memory 306. Logic-low and logic-high signals applied to this input terminal respectively enable and disable the data output drivers of the local memory 306.

Figure 5:
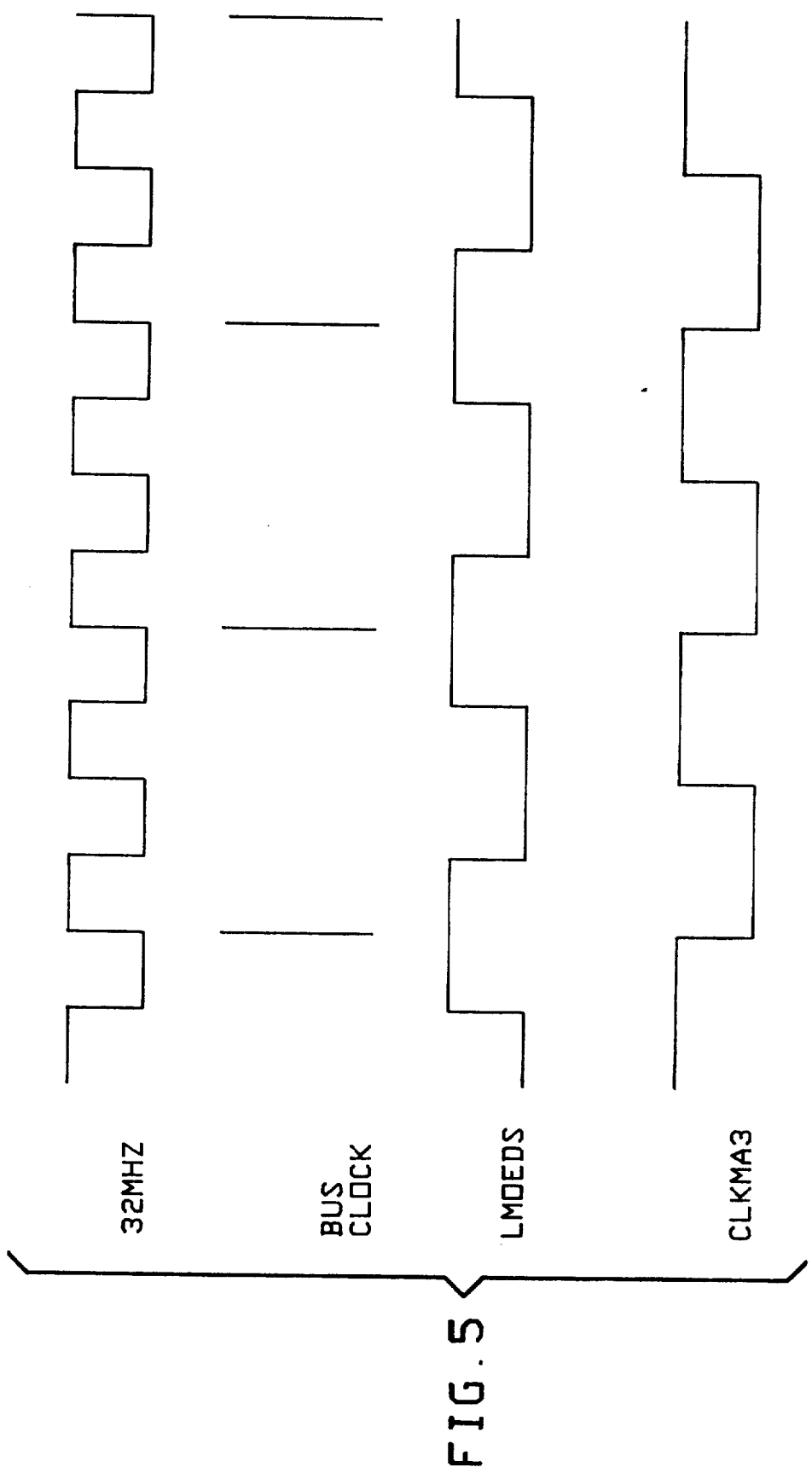
FIG. 5 is a timing diagram showing the relationship between clock signals and the LMOEDS signal generated by the circuitry shown in FIG. 4.

The signal LMOEDS/ is timed with respect to the bus clock signal so that it is logic-high for the first quarter cycle of the bus clock signal, logic-low for the next two quarter cycles, and logic-high again for the last quarter cycle. FIG. 5 shows the relative timing of the system clock signal, bus clock signal, and the signal LMOEDS/. The signal LMOE_L is thus logic-low during the second and third quarter-cycles, and undergoes a transition to a logic-high state at the start of the last quarter-cycle. In response to the high level at its OE/ input terminal, the local memory 306 disables its data output drivers and places them in the high impedance state.

In a similar manner, the TTL transceivers 326 which couple the local bus to the system bus 118 are controlled by the other signal, LMOEDS generated by flip-flop 300. LMOEDS is a periodic signal which is in a logic-high state for the first quarter cycle, a logic-low state for the next two quarter cycles and a logic-high state for the last quarter cycle of a bus access cycle. LMOEDS is combined with the bus clock signal, CLKMA2, by an AND gate 320. The resulting signal is a positive pulse one quarter cycle in length which occurs just prior to the start of the next bus cycle.

When the signal RCV/ is logic-low (active) and the signal TSEL is logic-high, a negative-going transition is generated at the output of NOR gate 318 and sent through buffer 322 before leaving the IC 330 via an output terminal RCVDEL. When the signal TSEL is logic-high, the negative-going edge of the signal RCVDEL is inverted by the open-collector NAND gates 324. This signal is applied to the input terminals OE/ of transceiver 326 one quarter cycle before the next bus access cycle. In response to the logic-high signal at its OE/ input terminals, the transceivers 326 place their output signals in the high impedance state. Thus, at the start of the next bus access cycle, the CMOS drivers 328, internal to the IC 330 may access the local bus without contention from the TTL drivers 326.

Figure 6:
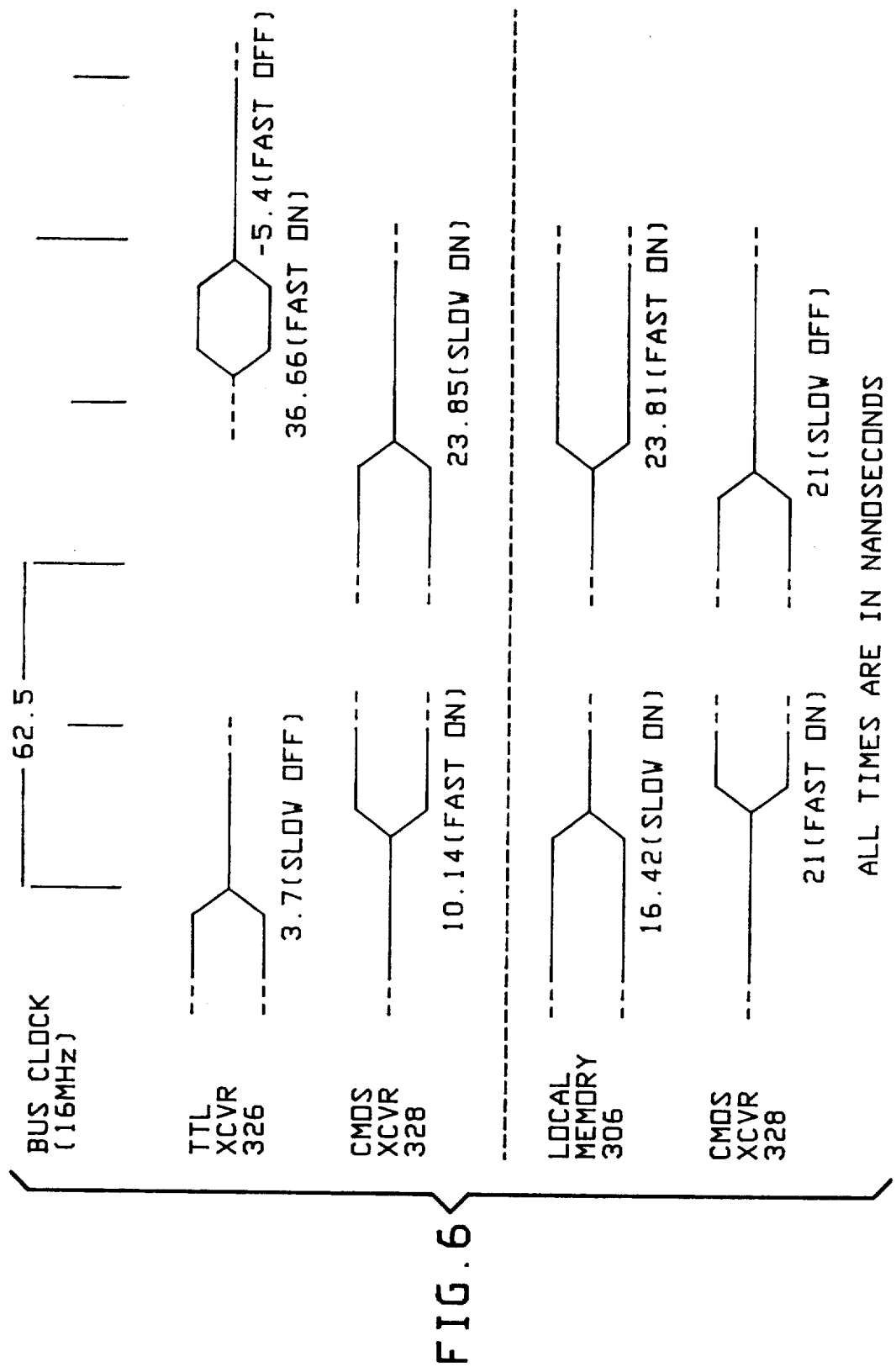
FIG. 6 is a timing diagram showing when data is enabled and disabled with respect to the bus access clock signal generated by the circuitry shown in FIG.

FIG. 6 is a timing diagram which illustrates how the exemplary embodiment of the Tristate contention elimination circuit succeeds in preventing Tristate contention between the TTL transceivers 326 and the CMOS drivers 328. In a worst case scenario, that is, with a slow TTL transceiver 326 and a fast CMOS driver 328, there is a safety margin of at least 6.44 nanoseconds between the time that the TTL transceiver 326 is forced into its high impedance state and the CMOS drivers 328 are enabled to provide data to the local bus 308. Conversely, if the transceivers 326 perform at their highest rated speed, and the CMOS drivers 328 perform at their slowest rated speed, then there is a safety margin of 12.81 nanoseconds.

Similar safety margins exist for the case where Local Memory 306 and CMOS drivers 328 access the local bus in sequence. The worst case scenarios are shown in FIG. 6. When Local Memory output drivers are slow to turn off, followed by fast CMOS driver activation, the bus is not driven for a safety margin time of 4.58 nanoseconds. Conversely, when a turn-off of slow CMOS drivers 328 is followed by a fast Local Memory 306 turn-on, the safety margin is 2.81 nanoseconds. Thus the Tristate contention elimination circuit ensures that there are never two drivers simultaneously accessing the common bus.

While the invention has been described in terms of an exemplary embodiment, it is contemplated that it may be practiced as outlined above with modifications within the spirit and scope of the appended claims.

The invention claimed is:

1. In a computer system in which a plurality of data sources having respective output drivers are coupled to a common bus using a common bus access clock signal, apparatus which selectively disables the output drivers of all but one of the data sources in order to prevent potential bus contention, said apparatus comprising:
   a source of first clock signal having a frequency greater than the frequency of the bus access clock signal;
   signal timing means, responsive to said first clock signal, for producing a periodic signal having transitions that are shifted in phase with respect to transitions of the bus access clock signal; and
   logic means, associated with a predetermined one of said plurality of data sources, for gating said periodic signal to produce multiple disable signals, said disable signals being applied to the output drivers of all of the data sources, except the predetermined data source, prior to each common bus access cycle,
   whereby the output drivers of all of the data sources except the predetermined data source are disabled prior to each common bus access cycle in order to prevent potential bus contention.

2. The apparatus of claim 1, wherein said signal timing means is fabricated on a CMOS integrated circuit that also contains the predetermined data source.

3. The apparatus of claim 1, wherein:
   said first clock signal has a frequency that is twice the frequency of said bus access clock signal; and
   said signal timing means includes a flip-flop responsive to said first clock signal for producing said periodic signal having substantially the same frequency as said bus access clock signal but being shifted in phase by 90° with respect to said bus access clock signal.

4. In a computer system in which a plurality of data sources are coupled to a common bus, in which access to the bus is controlled by a common bus access clock signal, and in which the data sources interface to the common bus using output drivers which are configured to be selectively enabled and disabled in response to respective device selection signals, a method for preventing the simultaneous access of said bus by more than one of the data sources, said method comprising the steps of:
   providing a first clock signal having a frequency greater than that of the bus access clock signal;
   generating, from said first clock signal, a periodic signal having transitions which are shifted in phase with respect to said bus access clock signal; and
   gating, within a predetermined one of said plurality of data sources, said periodic signal with said device selection signals to cause all but said predetermined data source to be disabled prior to each cycle of said bus access clock signal irrespective of the state of said device selection signals.

5. The method of claim 4 wherein:
   the system clock signal has a frequency that is twice the frequency of said bus access clock signal and the bus access clock signal exhibits changes in state which are substantially coincident with state changes of said system clock signal of a first sense; and
   the step of generating said periodic signal from said system clock signal includes the step of dividing said system clock signal in frequency by a factor of two to produce a signal which exhibits changes in state that are substantially coincident with state changes of said system clock signal of a second sense, opposite to said first sense.

6. In a computer system having a system bus and at least one common local bus in which output drivers of a plurality of data sources are coupled to the common local bus using a common local bus access clock signal, wherein the plurality of data sources interface to the common local bus using respective output driver which are configured to be selectively enabled and disabled in response to respective device selection signals, apparatus which selectively disables the output drivers of all but one of the data sources in order to prevent potential bus contention on the common local bus, said apparatus comprising:
   a source of first clock signal having a frequency greater than that of the common local bus access clock signal;
   signal timing means, associated with a predetermined one of said plurality of data sources, responsive to said first clock signal, for producing a periodic signal having transitions that are shifted in phase with respect to transitions of the common local bus access clock signal; and
   logic means, associated with said predetermined data source, for gating said periodic signal with said device selection signals to produce multiple disable signals irrespective of the state of said device selection signals, said disable signals being applied to the output drivers of all of the data sources, except the predetermined data source, prior to each common local bus access cycle.

7. An apparatus in accordance with claim 6, wherein said plurality of data sources comprise a local memory means, a system bus transceiver means, and a gate array means, and wherein said predetermined data source is said gate array means.

8. In a computer system having a system bus and at least one common local bus in which a plurality of data sources are coupled to the common local bus, in which access to the common local bus is controlled by a common local bus access clock signal, and in which the data source interface to the common local bus using respective output drivers which are configured to be selectively enabled and disabled in response to respective device selection signals, a method for preventing the simultaneous access of said local bus by more than one of the data sources, said method comprising the steps of:
   providing a first clock signal having a frequency greater than that of the common local bus access clock signal;
   generating, in a predetermined one of said plurality of data sources, a periodic signal from said first clock signal, said periodic signal having transitions which are shifted in phase with respect to said common local bus access clock signal; and
   gating, in said predetermined data source, said periodic signal with said device selection signals to condition all but said predetermined data source to be disabled prior to each cycle of said common local bus access clock signal irrespective of the state of said device selection signals.

* * * * *